US007562088B2

(12) United States Patent
Daga et al.

(10) Patent No.: US 7,562,088 B2
(45) Date of Patent: Jul. 14, 2009

(54) STRUCTURE EXTRACTION FROM UNSTRUCTURED DOCUMENTS

(75) Inventors: Rakshit Daga, Sunnyvale, CA (US); Gaurav Pandey, Minneapolis, MN (US)

(73) Assignee: SAP AG, Walldorf (DE)

( * ) Notice: Subject to any disclaimer, the term of this patent is extended or adjusted under 35 U.S.C. 154(b) by 243 days.

(21) Appl. No.: 11/645,861

(22) Filed: Dec. 27, 2006

(65) Prior Publication Data
US 2008/0162456 A1   Jul. 3, 2008

(51) Int. Cl.
*G06F 17/30* (2006.01)
(52) U.S. Cl. .......................... 707/101; 707/10; 707/100
(58) Field of Classification Search .................. 707/10, 707/100, 101
See application file for complete search history.

(56) References Cited

U.S. PATENT DOCUMENTS

| | | | |
|---|---|---|---|
| 6,029,195 A | 2/2000 | Herz | |
| 6,460,036 B1* | 10/2002 | Herz | 707/10 |
| 6,654,758 B1* | 11/2003 | Teague | 707/101 |
| 6,732,090 B2* | 5/2004 | Shanahan et al. | 707/3 |
| 6,738,780 B2* | 5/2004 | Lawrence et al. | 707/101 |
| 6,751,607 B2* | 6/2004 | Kraay et al. | 707/3 |
| 6,820,075 B2* | 11/2004 | Shanahan et al. | 707/3 |
| 6,993,535 B2* | 1/2006 | Bolle et al. | 707/104.1 |
| 7,024,416 B1* | 4/2006 | Ponte | 707/101 |
| 7,089,241 B1* | 8/2006 | Alspector et al. | 707/7 |
| 2003/0037251 A1* | 2/2003 | Frieder et al. | 713/200 |
| 2003/0195897 A1* | 10/2003 | Agrafiotis et al. | 707/101 |
| 2005/0198056 A1* | 9/2005 | Dumais et al. | 707/101 |
| 2005/0216496 A1* | 9/2005 | Chickering | 707/101 |
| 2005/0234953 A1* | 10/2005 | Zhang et al. | 707/101 |
| 2006/0020588 A1* | 1/2006 | Liu et al. | 707/3 |
| 2006/0155751 A1 | 7/2006 | Geshwind et al. | |
| 2007/0112898 A1* | 5/2007 | Evans et al. | 707/205 |
| 2008/0162455 A1 | 7/2008 | Daga et al. | |
| 2008/0222170 A1 | 9/2008 | Farnham et al. | |

OTHER PUBLICATIONS

Non-Final Office Action Received for U.S. Appl. No. 11/645,860 mailed on Oct. 17, 2008, 13 pgs.

JE Andrews, TB Patrick, DE Moxley, CM Meyer, M Popescu, and ME Sievert. Using co-occurrence data to determine a thesaurus structure. In Proc AMIA Symposium, p. 968, 1998.

Michael W. Berry, Susan T. Dumais, and Gavin W. O'Brien. Using linear algebra for intelligent informaiton retrieval Technical Report UT-CS-94-270, University of Tennessee, Knoxville, TN, USA, 1994.

(Continued)

*Primary Examiner*—Don Wong
*Assistant Examiner*—Kim T Nguyen
(74) *Attorney, Agent, or Firm*—Brake Hughes Bellerman LLP

(57) ABSTRACT

A document similarity detector may be used to determine a family of documents based on a similarity analysis between content of a seed document and content of the family of documents, the content of the seed document associated with at least one database object having at least one field. A content extraction system may be used to determine a ranking of a plurality of terms from within at least one document of the family of documents, based on a relative frequency with which each of the plurality of terms appears within the family of documents, and configured to extract at least one term from the plurality of terms as being associated with a value of the at least one field, based on the ranking.

18 Claims, 11 Drawing Sheets

OTHER PUBLICATIONS

Vinayak R. Borkar, Kaustubh Deshmukh, and Sunita Sarawagi. Automatic text segmentation for extracting structured records. In Proc. ACM SIGMOD, pp. 175-186, 2001.

Andrew Eliot Borthwick. A maximum entropy approach to named entity recognition. PhD thesis, 1999.

Venkatesan T. Chakaravarthy, Himanshu Gupta, Prasan Roy, and Mukesh K. Mohania. Efficiently linking text documents with relevant structured information. In VLDB, pp. 667-678, 2006.

William W. Cohen and Sunita Sarawagi. Exploiting dictionaries in named entity extraction: Combining semi-markov extraction processes and data integration methods. In Proc. Tenth ACM SIGKDD, pp. 89-98, 2004.

Ian Darwin and Donald C. Lindsay. A diff implementation in java, printed from http://javacook.darwinsys.com/javasrc/textproc/Diff.java, Mar. 26, 2005.

Scott C. Deerwester, Susan T. Dumais, Thomas K. Landauer, George W. Fumas, and Richard A. Harshman. Indexing by latent semantic analysis. Journal of the American Society of Information Science, 41(6):391-407, 1990.

J. T. Giles, L. Wo, and M. W. Berry. GTP (General Text Parser) Software for Text Mining. In H. Bozdogan, editor, Statistical Data Mining and Knowledge Discovery, pp. 455-471, 2003.

J. W. Hunt and M.D McIlroy. An algorithm for differential file comparison. Technical Report CSTR 41, AT&T Bell Laboratories, 1976.

Thorsten Joachims. Text categorization with suport vector machines: Learning with many relevant features. In ECML '98: Proceedings of the 10th European Conference on Machine Learning, pp. 137-142, 1998.

Imran Mansuri and Sunita Sarawagi. A system for integrating unstructured data into relational databases. In Proc. of the 22nd IEEE Int'l Conference on Data Engineering (ICDE), p. 29, 2006.

Mandar Mitra, Christopher Buckley, Amit Singhal, and Claire Cardie. An analysis of statistical and syntactic phrases. In Proceedings of RIAO-97, 5th International Conference "Recherche d'Information Assistee Par Ordinateur", pp. 200-214, 1997.

S.B. Needleman and C.S Wunsch. A general method applicable to the search for similarities in the amino acid sequence of two proteins. J. Molecular Biol., 48:443-453, 1970.

Stephen Robertson. Understanding inverse document frequency: on theoretical arguments. Journal of Documentation, 60(5):503-520, 2004.

Gerard Salton and Christopher Buckley. Term-weighting approaches in automatic text retrieval. Inf. Process. Manage. 24(5):513-523, 1988.

Esko Ukkonen. Algorithms for approximate string matching. Information and Control, 64(1-3):100-118, 1985.

M. Mitra and B. B. Chaudhuri. Information retrieval from documents: A survey. Inf. Retr., 2(2-3):141-163, 2000.

Eugene W. Myers. An O(ND) difference algorithm and its variations. Algorithmica, 1(2):251-266, 1986.

* cited by examiner

STRUCTURE EXTRACTION FROM UNSTRUCTURED DOCUMENTS

TECHNICAL FIELD

This description relates to the use and management of documents, including documents that contain text in some form.

BACKGROUND

Information is often created and stored in the form of text. For example, text typically serves as the basis for written documents, including books, newspapers, magazines, memos, or letters. These and other forms of text may be created and stored in computer-readable and computer-editable form. The use of text to record and share information is common to virtually all endeavors, including, for example, the fields of education or business. In business settings, for example, business-critical information may be described, conveyed, or stored as text, where the information may include customer information, employee information, product information, or business processes. Consequently, a success or profitability of a business may be affected by the manner in which such text is managed and used.

For example, business systems exist which store information related to business realms including supply chain management, product lifecycle management, or customer relationship management. If the text is created and stored in a structured manner, e.g., in an object-oriented database, then it may be possible to run queries against the stored data/text, to determine information that may be instrumental to the business.

In many instances, however, it may not occur that the text is created or stored in a structured manner. For example, even if a plurality of documents are created from a template, or according to some other guideline(s), the resulting plurality of documents may be stored simply as textual documents, with no convenient or practical mechanism to run queries against the stored information.

SUMMARY

According to one general aspect, a system may include a document similarity detector configured to determine a family of documents based on a similarity analysis between content of a seed document and content of the family of documents, the content of the seed document associated with at least one database object having at least one field. The system may include a content extraction system configured to determine a ranking of a plurality of terms from within at least one document of the family of documents, based on a relative frequency with which each of the plurality of terms appears within the family of documents, and configured to extract at least one term from the plurality of terms as being associated with a value of the at least one field, based on the ranking.

According to another general aspect, a computer program product may be tangibly embodied on a computer-readable medium and may be configured to cause a data processing apparatus to perform a difference-based analysis between content of a seed document and content of at least one document selected from a plurality of documents, the content of the seed document associated with at least one database object having at least one field, determine a difference level between the seed document and the at least one document, select an extraction technique for extracting at least one term from the content of the at least one document, based on the difference level, and extract the at least one term as being associated with a value of the at least one field, using the selected extraction technique.

According to another general aspect, a similarity analysis may be performed between each of a plurality of documents and a seed document. A similarity measure of each of the plurality of documents may be determined, based on the similarity analysis, and a family of similar documents may be selected from the plurality of documents, based on the similarity measure of each of the plurality of documents. A difference level of each of the family of similar documents may be determined, relative to the seed document, an extraction technique may be selected for each of the family of similar documents, based on the difference level, and at least one term may be extracted from at least one document of the family of similar documents, using the selected extraction technique.

The details of one or more implementations are set forth in the accompanying drawings and the description below. Other features will be apparent from the description and drawings, and from the claims.

DETAILED DESCRIPTION

Figure 1:
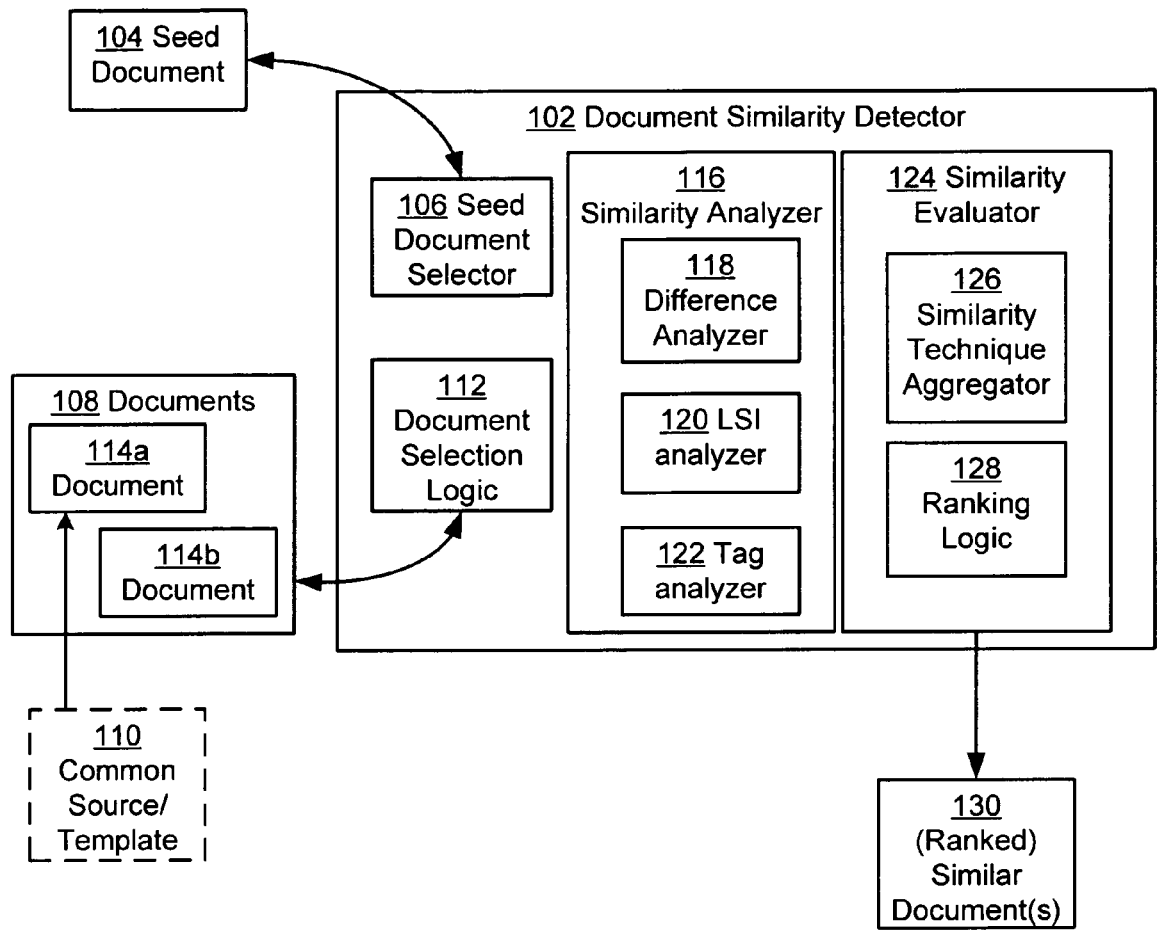
FIG. 1 is a block diagram of a document similarity detector.

FIG. 1 is a block diagram of a document similarity detector 102. In the example of FIG. 1, the document similarity detector 102 may be configured to determine similar documents, and/or similarities between documents. In this regard, there are many definitions or characterizations of what constitutes similarity. For example, documents may be similar in terms of included text (syntactically similar), or in terms of similar meaning (semantically similar), or in terms of related (meta) information, such as author, origin, publication, or intended use. The document similarity detector 102 may thus determine, for example, an extent to which documents are similar to one another, perhaps using a combination of multiple ones of the above-referenced types of similarity. In this way, a user may take advantage of having similar documents available, such as by retrieving similar documents when performing a search, or, as described below with respect to FIGS. 5-11, by extracting some or all of the text for use in creating and updating a structured (e.g., object-oriented) database.

In FIG. 1, the document similarity detector 102 may operate based on a seed document 104. The seed document 104 may represent, for example, virtually any document that may include text. For example, the seed document 104 may include a form, a report, a note, a memo, a paper, an e-mail, a presentation, a webpage, or any other document that is at least partially text-based.

The seed document 104 may be selected, designated, or otherwise determined using a seed document selector 106. The seed document selector 106 may be configured to select the seed document 104 based on a user request. For example, where the seed document selector 106 includes or is associated with a search engine, the seed document 104 may be a search result of an executed search. In other examples, the seed document selector 106 may select the seed document 104 as including a particular type of information, and/or as having been created, directly or indirectly, from a template or other document-creation guideline.

For example, the seed document 104 may have been selected by the seed document selector 106 from, or based on, a plurality of documents 108. For example, as just mentioned, the seed document selector 106 may be configured to select the seed document 104 based on a known or suspected association of a source or template 110 with the seed document 104, and/or with one or more of the plurality of documents 108.

For example, in business settings it is often the case that documents are created from a template, such as the template 110. For example, forms, contracts, or memos may be created using the template 110, either by direct substitution/insertion, or by indirect guidance of the template 110 in providing suggestions for a user to provide essentially free-form text entry within certain parameters.

In the example embodiment shown in FIG. 1, the document similarity detector 102 includes a document selection logic 112 configured to select at least one document 114a from the plurality of documents 108. The document selection logic 112 may select the document 114a randomly, sequentially, at the direction of a user, or by parsing the plurality of documents 108 for terms that are also contained in the seed document 104. The document selection logic 112 may be configured to ensure that a particular document is selected and analyzed for similarity to the seed document 104 only once. In practice, the plurality of documents 108 may constantly be growing, such as when the plurality of documents 108 represent a plurality of patient, customer, or employee records that are frequently growing in number over time.

In practice, then, the document similarity detector 102 may be configured to compare the seed document 104, as determined by the seed document selector 106, with one or more of the documents 114a, 114b of the plurality of documents 108, as selected by the document selection logic 112. In so doing, the document similarity detector 102 may perform a similarity analysis between, for example, the seed document 104 and the document 114a, e.g., using a similarity analyzer 116, and may thus obtain a similarity measure for the document 114a, and similar documents, relative to the seed document 104. The similarity analyzer 116 may thus be configured to compare the document 114a to the seed document 104, such as by searching the document 114a for terms contained within the seed document 104. As described in more detail, below, the similarity analyzer 116 also may perform more than one type of similarity analysis, so as to enable the calculation of an aggregated similarity measure based on the more than one type of similarity analysis.

For example, the similarity analyzer 116 may include a difference analyzer 118 configured to perform a difference-based analysis of the seed document 104 and the document 114a, a latent semantic index analyzer 120 configured to perform a latent semantic indexing analysis of the seed document 104 and the document 114a, and/or a tag analyzer 122 configured to compare tags associated with the seed document 104 relative to tags associated with the document 114.

More particularly, for example, the difference analyzer 118 of the similarity analyzer 116 may be configured to measure a fraction of change between the seed document 104 and the document 114a. In an example embodiment, the difference analyzer 118 utilizes a difference-based algorithm known as the Diff algorithm. The Diff algorithm is but one example of a number of techniques known to be used, for example, to compare two documents and/or to track changes as a document is edited. For example, the Diff algorithm or similar algorithms may find pieces of text that are matched and/or identical between the seed document 104 and the document 114a, and may then categorize mismatched portions as insertions, deletions, or replacements. Thus, the diff algorithm, and similar algorithm(s), describes the syntactic similarities or differences between the seed document 104 and the document 114a by determining terms that have been added, replaced, or deleted from the seed document 104 by the document 114a.

In this example embodiment, the difference analyzer 118, after applying the Diff algorithm to the seed document 104 and the document 114a, may calculate a number of terms $d_1$ in the seed document 104, a number of terms $d_2$ in the document 114a, a set of terms $S_1$ that have been either replaced or deleted from the seed document 104 relative to the document 114a, and a set of terms $S_2$ that have been inserted into the seed document 104 relative to the document 114a. The difference analyzer 118 may then determine a difference-based similarity between the seed document 104 and the document 114a, based on these calculations (e.g., based on the set of terms $S_1$ that have been either replaced or deleted from the seed document 104 relative to the document 114 and the set of terms $S_2$ that have been inserted into the seed document 104 relative to the document 114).

One such difference-based similarity is calculated by taking the lower of the two terms: $((|d_1|-|S_1|)/|d_1|)$ and $((|d_2|-|S_2|)/|d_2|)$. Or, expressed mathematically as Eq. 1:

$$\text{sim}_{\text{diff}} = \min[((|d_1|-|S_1|)/|d_1|),((|d_2|-|S_2|)/|d_2|)] \qquad \text{Eq. 1}$$

In other words, the proportion of change between the seed document 104 and the document 114a may be defined by the difference in absolute values of $d_1$ and $S_1$, relative to $d_1$ itself, so that a fraction of changed (e.g., replaced or deleted) terms relative to the total number of terms provides an extent to which the documents 104, 114a are similar (or not similar) to one another. Similarly, the proportion of change between the seed document 104 and the document 114a may be defined by the difference in absolute values of $d_2$ and $S_2$, relative to $d_2$ itself, so that a fraction of changed (e.g., inserted) terms relative to the total number of terms provides an extent to which the documents 104, 114a are similar (or not similar) to one another. By taking the minimum of these measures, the difference based similarity may be seen to be inversely proportional to a maximum fraction of change of the seed document 104 and the document 114a, thereby measuring how much of the syntax of the seed document 104 varies relative to the syntax of the document 114a.

In practice, as described in more detail herein, the seed document 104 and/or the document 114a may include, or may be created directly from, the template 110, e.g., by simply replacing or adding terms relative to the template 110. The difference analyzer 118 may be particularly useful in measuring and characterizing the similarity of such syntactically-similar documents. For example, the difference analyzer 118 may be seen to measure an extent to which the seed document 104 and the document 114a were created from a common template using the direct creation method, as described in more detail, below.

The similarity analyzer 116 also may include the latent semantic index analyzer (LSI) 120, which may be configured to measure semantic similarity of the seed document 104 and the document 114a by using the technique of latent semantic indexing. Latent semantic indexing is a known technique, the details of which are not discussed explicitly herein, that measures a semantic similarity between documents; e.g., takes into account the same or different meanings or contexts that may be associated with different or the same terms.

The tag analyzer 122 of the similarity analyzer 116 may be configured to perform a comparison of tags, or other metadata, that may be associated with the seed document 104, relative to tags associated with the document 114. For example, tags may be associated with documents in order to enable efficient organization or use of documents. For example, the tags may indicate an origin, characteristic, or intended use of the associated document. Then, if $T_1$ and $T_2$ are the sets of tags for the seed document 104 and the document 114a, respectively, and $T_{common}$ represents the number of tags that the seed document 104 and the document 114a have in common, then the tag-based similarity between the seed document 104 and the document 114a may be computed as the lower of $T_1/T_{common}$ or $T_2/T_{common}$. Thus, the tag-based similarity is the lower fraction of tags that are the same between the seed document 104 and the document 114a.

Although the similarity analyzer 116 is illustrated as including the similarity analyzers 118, 120, and 122, it will be appreciated that these are just examples, and that other similarity analysis techniques may be used. For example, Independent Component Analysis (ICA), which is similar to LSI, or Inverse Document Frequency (IDF), which is discussed in more detail, below, may be used.

In the example of FIG. 1, a similarity evaluator 124 may be used that receives the outputs of the (components of the) similarity analyzer 116 for additional processing and output to a user of the document similarity detector 102. For example, the similarity evaluator 124 of the document similarity detector 102 may be configured to determine a similarity measure between the seed document 104 and the document 114a, based on some or all of the similarity analyses performed by the similarity analyzer 116. In the example embodiment shown in FIG. 1, the similarity evaluator 124 includes a similarity technique aggregator 126 configured to calculate a combined or aggregated similarity measure, based on two or more of the difference-based analysis, the latent semantic indexing analysis, and the comparison of tags (or other similarity calculation techniques).

In an example embodiment, each of the three similarity analyzers 118, 120, 122 may be associated with a normalized value or value range, e.g., a value range between zero and one. The similarity technique aggregator 126 may compute the aggregated similarity measure by giving each of the three similarity measures equal weights, or may calculate a weighted average by assigning different weights to each of the three similarity measures. Or, the similarity technique aggregator 126 may be configured to calculate an average of the measures based on the difference-based analysis and the latent semantic indexing analysis, where the tag-based similarity is zero (implying that either the seed document 104 or the document 114, or both, had no tags), and calculate an average of all three measures where the tag-based similarity is greater than zero. More generally, the similarity evaluator 124 may perform an appropriate combination of the similarity analyzers 118, 120, 122, e.g., in response to a particular context of use of the document similarity detector 102 (e.g., where semantic similarity is more important for a particular application than syntactic similarity, or vice-versa), or in response to a user request/instruction.

The similarity evaluator 124 may further include a ranking logic 128 configured to rank or arrange the documents 114 relative to one another, e.g., in order of their similarity measures or their aggregated similarity measures, where the document similarity detector 102 has performed the similarity analysis on one or more of the documents 108. The ranking logic 128 may then select and rank similar documents 130 as being part of a family of similar documents. For example, as mentioned above, the aggregated similarity measure may be normalized or defined as always being between 0 and 1, so that the ranked similar documents 130 may be ordered from most to least, or least to most, similar.

In practice, documents that are least similar to the seed document 104, or to other documents such as the document 114a, may not be useful to whatever endeavor is being supported by the document similarity detector 102 (e.g., supporting a search result by providing additional, similar documents). Consequently, these least-similar documents may be lowest ranked within the ranked similar documents 130, and some number of these least-similar documents may be filtered or removed from the list of the ranked documents 130.

Figure 2:
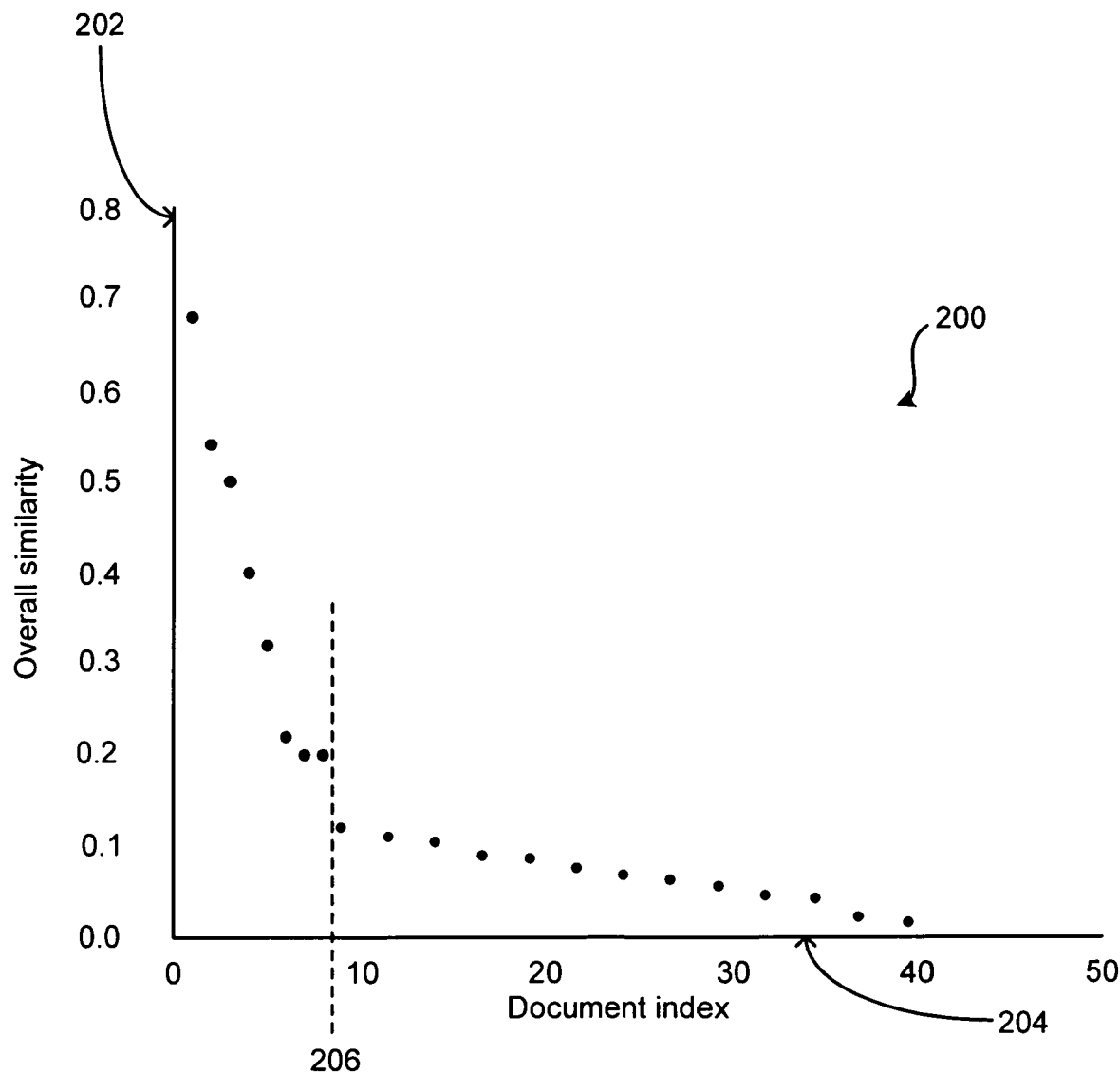
FIG. 2 is a graph showing a distribution of similarity measures, relative to a seed document, for a plurality of documents.

In an example embodiment, there may be a fixed number or percentage of the documents that are maintained/removed. In other example implementations, the ranking logic 128 may adaptively select the number of similar documents 130 to be ranked after performing a similarity analysis on a number of the documents 108 compared to the seed document 104. For example, the ranking logic 128 may determine a distribution curve of the similarity measure of each of the documents 108 (as shown in FIG. 2), and may thereafter determine a subset of the documents 108 based on a designated area under the distribution curve. This subset may be based, for example, on a determination that a sum of the similarity measures of the subset will approximate a designated proportion of a sum of the similarity measures of all of the documents. In an example embodiment, the designated proportion may be one-half, or some other suitable percentage, as described in more detail, below, with respect to FIG. 2.

FIG. 2 is a graph 200 showing a distribution of similarity measures, relative to the seed document 104, for the plurality of documents 108. As shown in FIG. 2, the distribution of the similarity measure 202 versus the number of documents with the similarity measure 202, shown as document index 204 in FIG. 2, will typically be skewed. That is, some portion of the documents may be very similar or virtually identical, while others may be only marginally similar, if at all. For example, if the difference analyzer 118 is used and the seed document 104 as well as some of the documents 108 were all created directly from the template 110, then such directly-created documents are likely to have very high similarity measures/rankings, while other documents that were not created from the template 110 may have very low similarity measures.

Depending on a number of the documents 108 and the number of documents selected therefrom, it may be impractical to designate a fixed number of documents to select or filter out. However, by selecting the subset of documents 114 that represent a designated area under the distribution curve, as just described, the ranking logic 128 selects similar documents based on their relative degrees of similarity in an adaptive manner that is not dependent on a total number of available or selected documents.

For example, by starting with the document of the ranked documents 130 and having the highest similarity ranking/measure, and then adding additional documents until the sum of the similarities of the selected documents is half (or some other percentage) of the sum of the similarity measures of the documents in the plurality of documents 108, it may be seen that a desired and relevant number of similar documents may be selected, regardless of how numerous or how similar the selected documents may be. In FIG. 2, the results of such an operation are shown as being selective of documents to the left of the dashed line 206, including the first nine of twenty-two documents. The percentage (e.g., half) may be selected based on an expected level of similarity.

Figure 3:
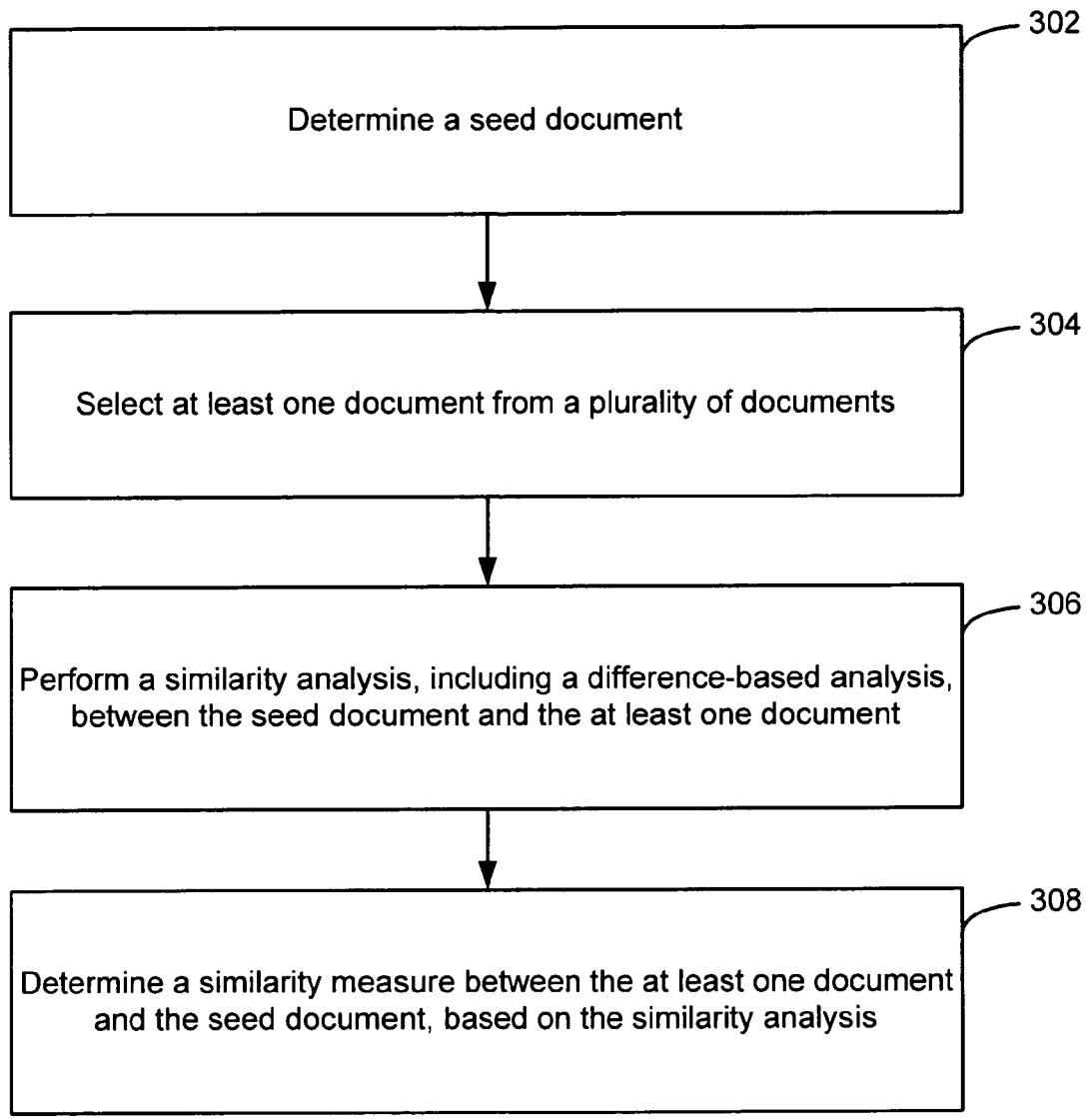
FIG. 3 is a flowchart illustrating a method of detecting similar documents using the document similarity detector of FIG. 1.

FIG. 3 is a flowchart 300 illustrating a method of detecting similar documents using the document similarity detector 102 of FIG. 1. As shown in FIG. 3, a seed document 104 may be determined (302). For example, the seed document selector 106 may select the seed document 104 from a search result set of a search, or based on an inclusion of the template 110 within the seed document 104.

At least one document 114 may be selected from the plurality of documents 108 (304). For example, the document selection logic 112 may select the at least one document 114a by searching the plurality of documents 108 for terms contained within the seed document 104. In other examples, the document 114a may be selected as part of a sequence of selecting the documents 108, or may be selected at random from the documents 108.

A similarity analysis, including a difference-based analysis, may be performed between the seed document 104 and the at least one document 114 (306). For example, the similarity analyzer 116 may perform the similarity analysis, or analyses, including the difference-based analysis of the difference analyzer 118, and also may perform a secondary similarity analysis, such as a latent semantic indexing analysis or tag-based analysis, as shown in FIG. 1. The similarity evaluator 124 may then calculate an aggregated similarity measure, based on a combination of the difference-based analysis and on the secondary similarity analysis (e.g., using the similarity technique aggregator 126).

The similarity analyzer 116 may perform the similarity analysis by performing the difference-based analysis based on a maximum fraction of change between the seed document 104 and the at least one document 114a. The similarity analysis also may comprise, as shown above in Eq. (1), that the difference analyzer 118 may calculate a number of terms replaced, deleted, and/or inserted in a comparison of the seed document 104 and the at least one document 114a, determine a first measurement of terms inserted into the seed document 104 relative to the at least one document 114a, determine a second measurement of terms replaced and/or deleted from the seed document 104 by the at least one document 114, and determine the difference-based similarity based on the first measurement and the second measurement.

In an additional or alternative embodiment, performing the similarity analysis comprises performing a latent semantic indexing analysis. Or, performing the similarity analysis may comprise performing a comparison of tags associated with the seed document 104 relative to tags associated with the at least one document 114. The similarity analysis may also include calculating an average, or a weighted average, of at least two of the difference-based analysis, the latent semantic indexing analysis, and the comparison of tags associated with the seed document 104 to tags associated with the at least one document 114.

Also according to FIG. 3, a similarity measure may be determined between the at least one document 114a and the seed document 104, based on the similarity analysis (308). For example, the similarity evaluator 124 may include the ranking logic 128 that is configured to compare and rank the similarity measures of the plurality of documents 108, and thus, ultimately, may rank at least a subset of the plurality of documents 108 relative to one another to define the family of similar documents 130.

Figure 4:
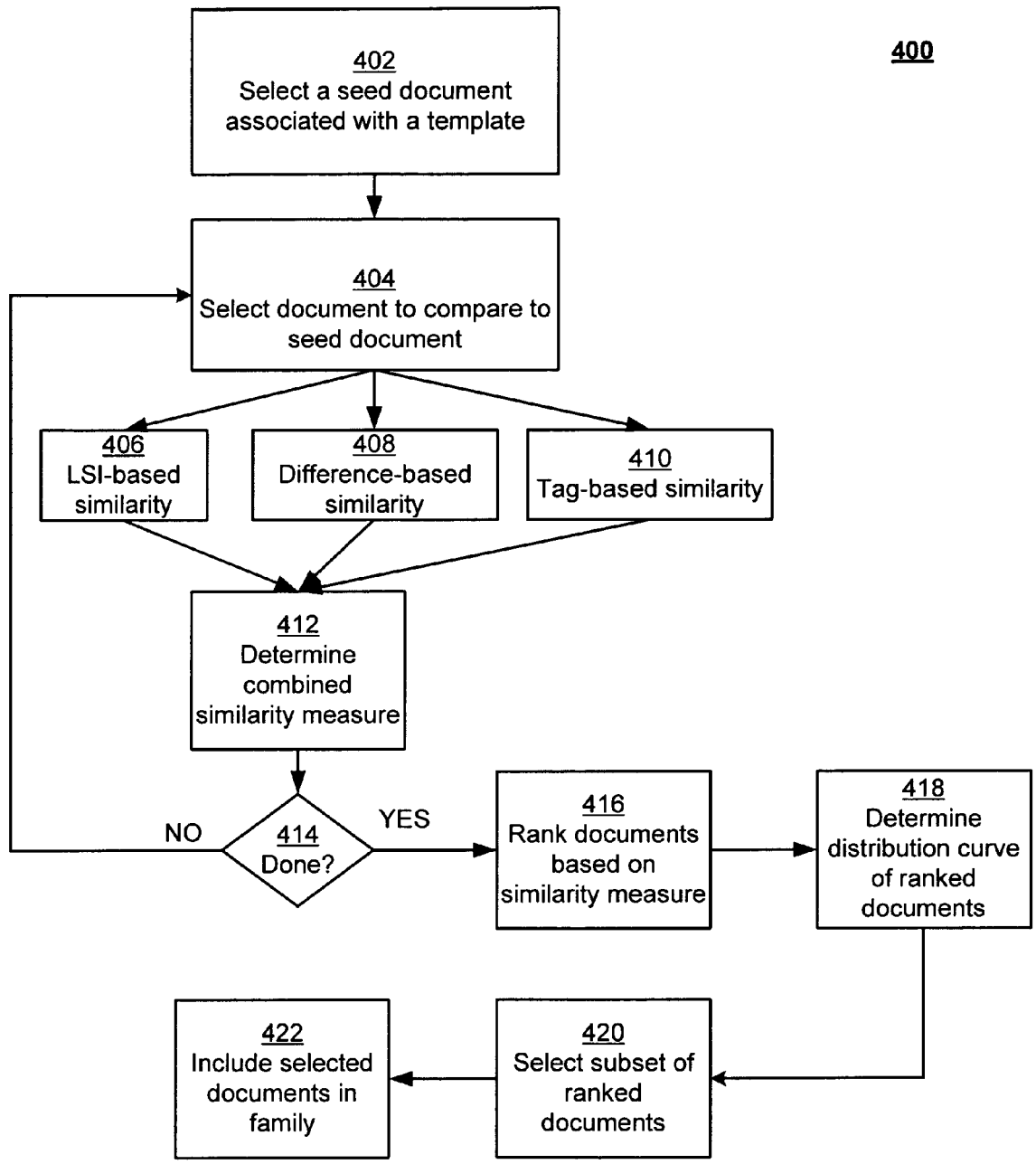
FIG. 4 is a flowchart illustrating a method for selecting a family of documents according to an example embodiment.

FIG. 4 is a flowchart illustrating a method 400 of selecting the family of similar documents 130 according to an example embodiment. In the example embodiment shown in FIG. 4, the seed document 104, which in this example is associated with the template 110, may be selected (402), e.g., by the seed document selector 106. Then, the document selection logic 112 may be used to select the document 114a may be selected from the plurality of documents 108 as a first document to be compared to the seed document 104 (404). The document 114 may be compared to the seed document 104 using one or more of latent semantic indexing-based similarity (406), difference-based similarity (408), or tag-based similarity (410), e.g., using the corresponding analyzers 118-122 of FIG. 1. A combined similarity measure between the document 114 and the seed document 104 may be determined, for example, by using either a weighted or equal average of the latent semantic index based similarity, the difference-based similarity, and the tag-based similarity (412), as executed by the similarity technique aggregator.

After determining the combined similarity measure of the document 114, the document similarity detector 102 may determine whether to continue evaluating more of the documents 108 (414). For example, the document selection logic 112 may be configured to select a certain number or percentage of the documents 108, or may execute some other criteria for selecting from among the documents 108.

If a desired quantity of the documents 108 has not been evaluated, then another document, e.g., the document 114b, may be selected (404). The process may continue until a desired number of the documents 108 have been selected (414), e.g., until all of the documents 114 in the plurality of documents 108 have been compared to the seed document 104.

The documents 108 may then be ranked based on the just-determined similarity measure(s) (416), such as by the ranking logic 128. A distribution curve of the ranked documents 114 may then be determined (418), as discussed with reference to FIG. 2, so as to select a subset of ranked documents 114 (420). For example, the ranking logic 128 may perform this selection or filtering of the selected documents, and output the family of similar (ranked) documents 130 (422).

Using the system 100 of FIGS. 1-4, then, a user may begin with a large number of unstructured and (from a data mining perspective) unrelated documents, which may include contracts, forms, memos, or other documents or document types that each may have been created using a corresponding template (e.g., a contract template, a form template, or a memo template). Consequently, the resulting, ranked family of documents 130 may represent, in this example, a "contracts" family, a "forms" family, or a "memos" family. As a result, the user may be provided with such families and may benefit, for example, from improved search results, improved knowledge management, and/or better understanding and grasp of what documents and information are included within a large number of documents.

As a specific example of a use of the document similarity detector 102, FIGS. 5-11 discuss example implementations in which content is extracted from the documents 108 in a format that is conducive to subsequent storage and querying thereof. For example, content from the documents 108 which is included therein as free form text may be extracted and stored as database objects, which may then be queried to obtain, e.g., useful business information, as described in more detail, below.

Figure 5:
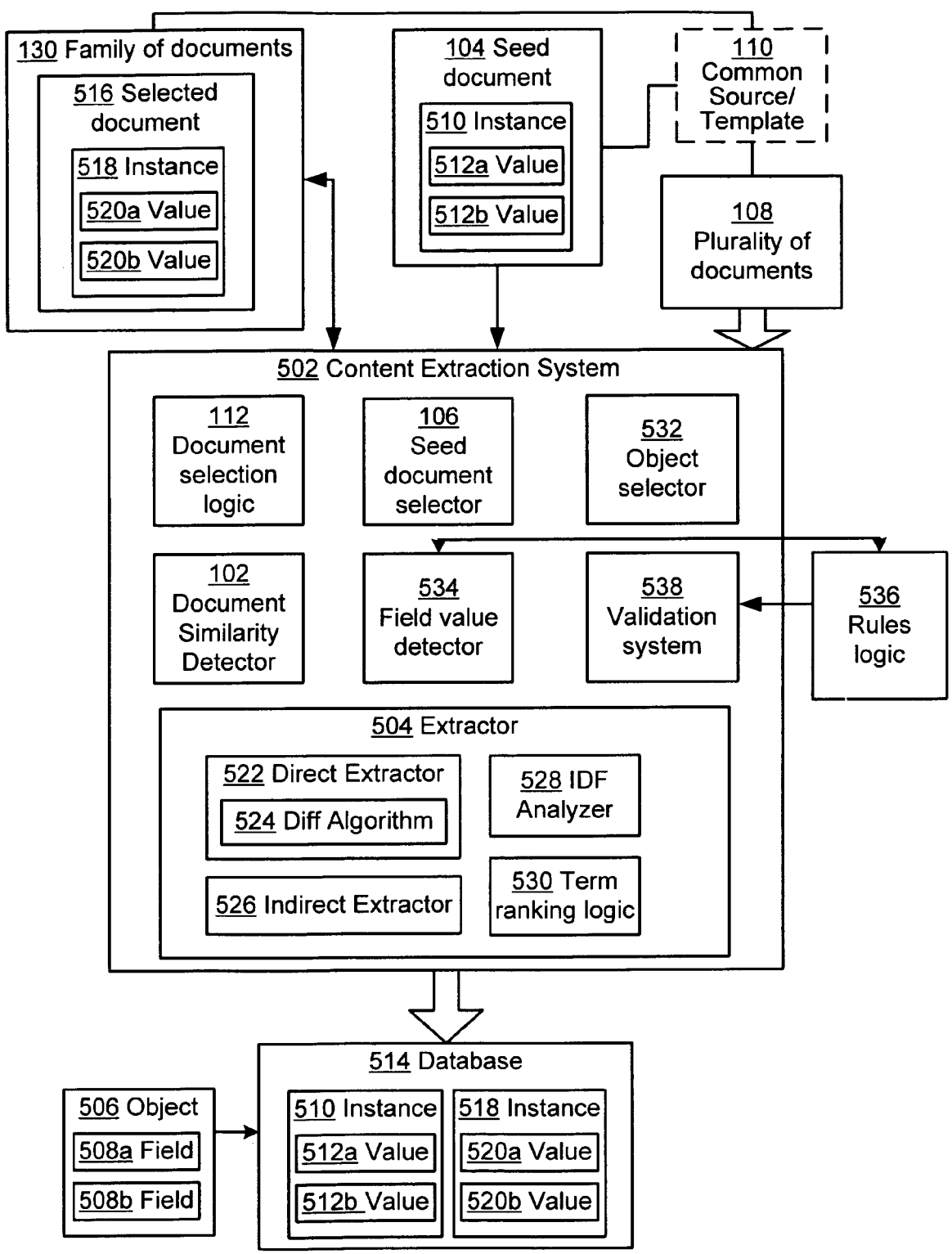
FIG. 5 is a block diagram illustrating a system including a content extraction system.

FIG. 5 is a block diagram showing a content extraction system 502 according to an example embodiment, which may be embodied in a computer program. In the example of FIG. 5, an extractor 504 of the content extraction system 502 may be configured to extract content from documents of the family of documents 130, and may be further configured to determine an associated structure for the extracted content. In this way, the resulting structured content may be stored and later queried or otherwise used, for example, to increase a productivity and profitability of a business.

More particularly, the content extraction system 502 takes advantage of the presumption that differences in terms between very similar documents may be meaningful in associating the different terms with a structure, including a database structure such as a database object 506. For example, the different terms may be associated as values of fields 508a, 508b of the database object 506, and stored within a database 514.

Thus, in the example of FIG. 5, the object 506 is illustrated that represents a database structure in which an item, entity, or concept is described in terms of individual attributes or fields 508a, 508b. For example, the database object 506 may include an entity such as a 'person' object, which may have fields 508a, 508b that may each be associated with the 'person' object and that may include 'name,' 'nationality,' 'profession,' 'income,' or other discrete piece of information that may be associated with a person. The use of such database objects, by themselves, is known, and many different examples of types of such objects also are known, including, as a few, non-limiting examples, customers, employees, products for sale, purchases, or virtually any other discrete piece of information that a business or other organization may wish to store in association with related fields/values for later access and use. In the content extraction system 502, however, these values are identified, and used to populate the database 514, based on the fact that the values represent differences in terminology between very similar documents, such as the family of documents 130.

In FIG. 5, as shown, the seed document 104 may include one or more instances of the object 506, including, e.g., the instance 510 having values 512a, 512b for the fields 508a, 508b. For example, and continuing the example in which the object 506 is a 'person' object, the instance 510 of the 'person' object 506 may represent a particular person having the values 512a, 512b for the fields 508a, 508b. For example, the instance 510 may include associated values 512a, 512b for the fields 508a, 508b mentioned above of: name="William Smith," nationality="U.S. citizen," as well as additional values for corresponding fields, not shown in FIG. 5, such as profession="engineer," and income="$75,000."

In practice, and as described in more detail, below, the extractor 504 and other elements of the content extraction system 502 may be configured to populate a database 514 with instances of the object 506, as those instances are extracted from documents of the family of documents 130. For example, the family of documents 130 may include a selected document 516 that may be compared to the seed document 104 to extract an instance 518 of the object 506, the instance 518 including values 520a, 520b of the fields 508a, 508b, as shown.

As illustrated in FIG. 5, the database 514 may be configured and structured in accordance with the object 506. Accordingly, the database 514 may be configured to receive and store the instance 510 and associated field values 512a, 512b of the seed document 104, as well as the instance 518 and associated values 520a, 520b from the selected document(s) 516 selected from the family of documents 130 (that is, with the field values 520a, 520b having been extracted from the selected document 516). Thereafter, the database 514 may be instrumental in providing access to, and use of, the object instance(s) contained therein. For example, similar to the situation where the object 506 is the 'person' object referenced above, it may occur that the database 514 includes customers of an enterprise. By providing specific information about the customers, the enterprise may make use of the database 514 to derive marketing strategies or other techniques for interacting with the customers.

The seed document selector 106 may be configured to choose the same seed document 104 for use during extraction of the field value 520a as previously might have been used to select the family of documents 130, e.g., with the document similarity detector 102. The document selection logic 112 may select the document 516 randomly from the family of documents 130, or in sequential order (e.g., based on the similarity ranking determined by the ranking logic 128), or based on some other attribute of the documents 130 within the family. The document selection logic 112 may be configured to select all of the documents 130 within the family of documents 130 without selecting the same document 516 twice (e.g., may store already-considered documents, or references thereto, in a memory to avoid such duplicative results).

The extractor 504 of the system 502 may be configured to select an extraction technique from a plurality of extraction techniques in order to extract the instance 516 and associated values 520a, 520b from the selected document 516, based on, for example, a determined difference level between content of the seed document 104 and the selected document 516. One criteria to consider when selecting an extraction technique based on a determined difference level may relate to the manner in which the selected document was created.

For example, as referenced above, the common source 110 includes a document that specifies how the field values of an object instance are to be incorporated into a document, e.g., at a time of creation of the document (which, here, is represented by the selected document 516). For example, many documents are created either directly or indirectly from a document that is similar in syntax and/or content, which document may be considered a template for successive documents.

A direct creation method may be considered to be a "cut-and-paste" method, e.g., the overall syntax of the document remains the same as the template 110, while specific terms in the template are replaced with other specific terms in the created document, or while new terms are inserted in a defined area of the template 110. For example, a sentence such as "X is writing a paper for W" in the template may be modified to "Jack Smith is writing a paper for the 2006 workshop."

Meanwhile, as referenced above, an indirect creation method using the common template 110 contemplates that the users may use the semantic content of the template as a guide, or as one or more suggestions, but may not create any of these such documents 130 by simple replacement or insertion of terms, as in the direct case. In either the direct or indirect case, the documents created from the template 110 may be similar, and significant terms of documents created using the template 110 may be considered field values of an instance of an object.

For example, terms may be considered to be significant based on a relative frequency with which the terms appear within the family of documents 130. For example, in the family of documents 130 when the object 506 is a 'person' object, it may occur that any particular name may appear very infrequently, or only once (unless multiple persons happen to have the same name). Consequently, the relative frequency of each name may be very low, and, in this example, may represent a name that was inserted into the selected document 516 when creating the selected document 516 from the template 110. More generally, then, it may be seen that terms which appear very infrequently within the family of documents 130 may be considered to be significant, since they may represent, for example, replaced or inserted terms into a single document The document similarity detector 102 of the system 502 may be configured to determine a difference level between content of the seed document 104 and the selected document 516. The difference level may be determined as described above, with reference to the difference analyzer 118 shown in FIG. 1. For example, the determined difference level may indicate whether the selected document 516 was directly created from the template 110 (in which case the difference-based similarity will likely be relatively high), or indirectly using the template 110 only as a guide (in which case the difference-based similarity will likely be relatively low).

More specifically, for example, the difference level determined by the difference analyzer 118 of the document similarity detector 102 may be compared to a threshold difference level. For example, if the determined difference level between the seed document 104 and the selected document 516 is less than the threshold difference level (so that there is a high difference-based similarity), then the selected document 516 may be considered to have been directly created using the template 110, leading the extractor 504 to utilize a direct extractor 522 to perform a direct extraction method (described with reference to FIG. 8, where, as described, the direct extractor 524 may also make use of the Diff algorithm 524 referenced above, or a similar technique).

Alternatively, if the determined difference level between the seed document 104 and the selected document 516 exceeds the threshold difference level (so that there is a low difference-based similarity), then the selected document 516 may be considered to have been indirectly created from the template 110, leading the extractor 504 to utilize an indirect extractor 526 to perform an indirect extraction method (described with reference to FIG. 9).

Both the direct extractor 522 and the indirect extractor 526 may be configured to utilize an inverse document frequency (IDF) analyzer 528 to assign numerical values to terms such as the second values 520a, 520b, where high IDF values correlated with high likelihood that a given term is actually a value of, e.g., the field 508a of the object 506. That is, the IDF analyzer 528 may be seen as one example by which a relative frequency of terms in the selected document 516 appear within the family of documents 130.

In this context, as discussed in more detail below, the IDF analyzer 528 may assign an IDF value to a term in the selected document 516, based on a number of documents "N" within the family of documents 130, relative to a number of documents "$N_t$," in which the term appears within the family of documents 130. More specifically, an example IDF equation may be written as Equation 2:

$$IDF_t = \log(N/N_t) \qquad \text{Eq. (2)}$$

As referenced above, the content extraction system 502 takes advantage of the insight that differences in terms between very similar documents may be significant in determining whether the different terms are likely to be values of fields of an object, such as of the object 506. In this context, the IDF equation of Eq. (2) may be seen to represent a measure of such differences in terminology, although other such measures may be used as additional or alternative techniques. For example, such differences may be determined as including positional differences of terms within compare documents, vicinity analysis applied to terms relative to other terms or document portions, statistically improbable phrases, or received human input/intelligence.

Figure 8:
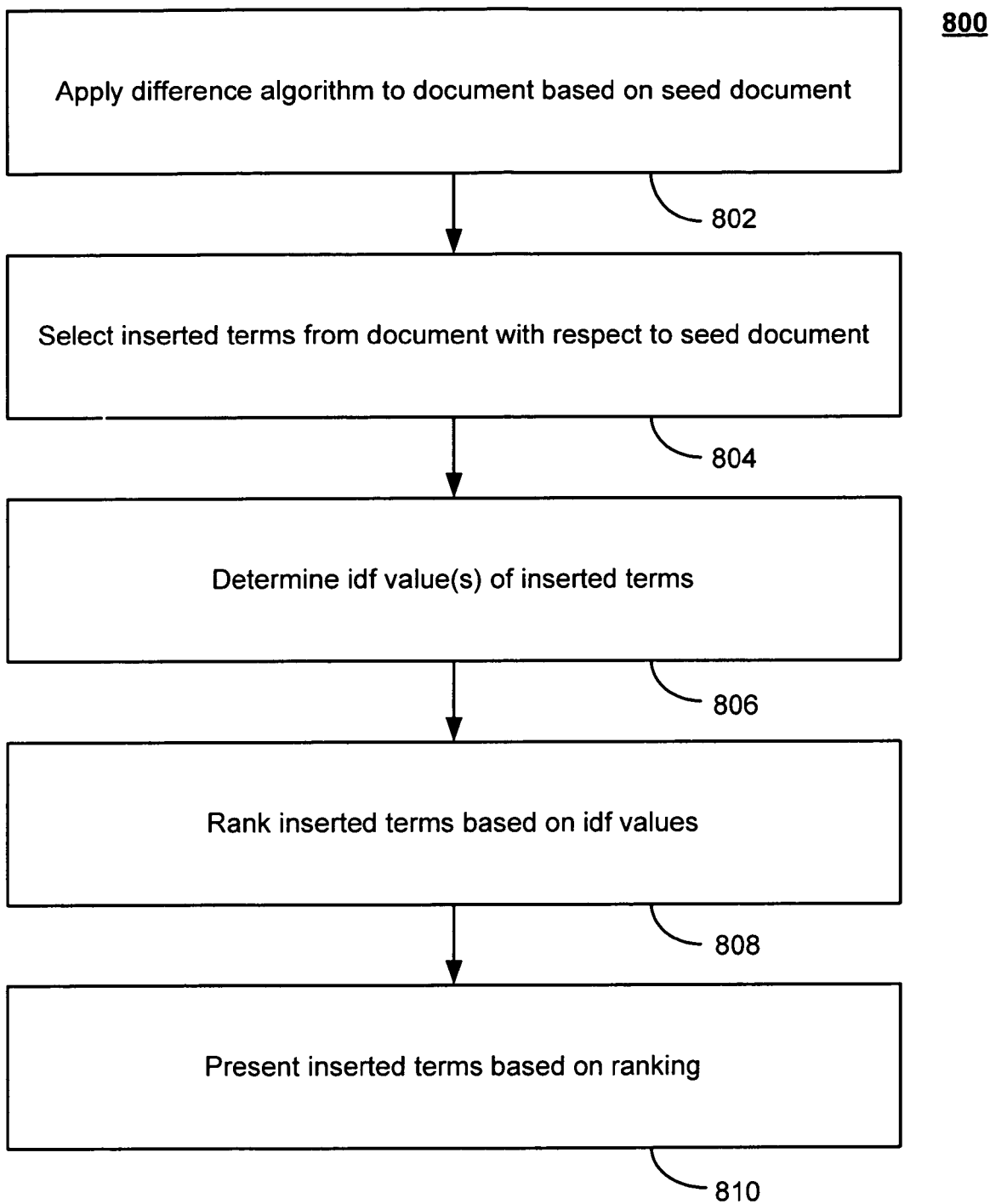
FIG. 8 is a flowchart illustrating a direct extraction method according to the methods of FIGS. 6 and 7.
Figure 9:
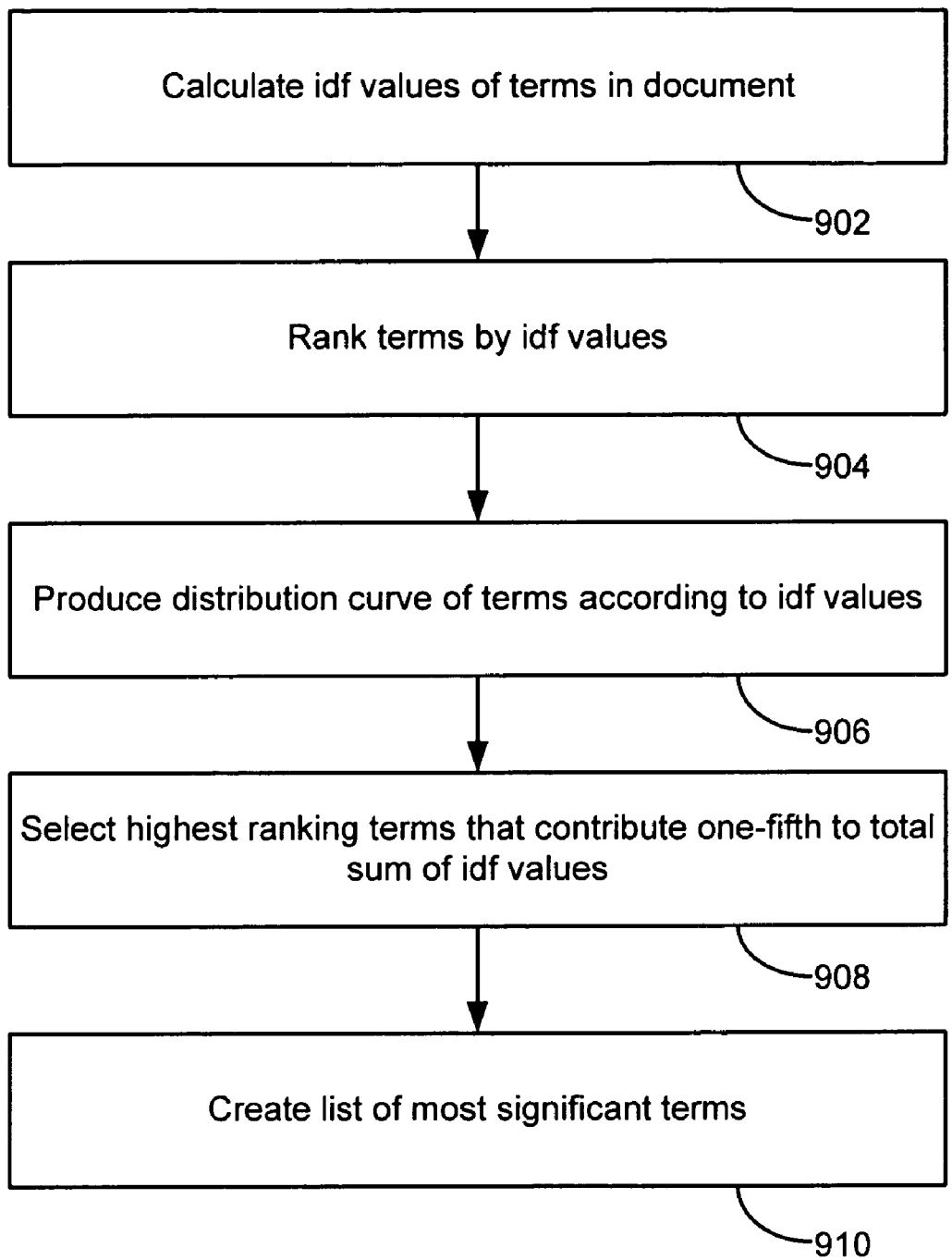
FIG. 9 is a flowchart showing an indirect extraction method according to the methods of FIGS. 6 and 7.

Also in FIG. 5, a term ranking logic 530 may be included that is configured to rank and select the terms based on their inverse document frequency values, as discussed, e.g., with reference to FIGS. 8 and 9. By ranking and selecting the terms in this way, it may be determined that the highest-ranking terms are most likely to correspond, for example, to the values 520a, 520b.

The content extraction system 502 may be configured to associate the object 506 in the database 514 with corresponding terms representing (potential) instance(s) 518 extracted from the selected document 516. For example, an object selector 532 of the system 502 may be configured to select, detect, formulate, and/or record the object 510 from the seed document 104 and/or based on the template 110, and a field value detector 534 may be configured to detect the value(s) 520a, 520b of at least one field 508a, 508b of the instance 518 of the object 506 found in the content of the selected document 516.

Operations of the object selector 532 and the field value detector 534 are described in more detail, below, e.g., with reference to FIGS. 6, 7 and 11. Generally, however, it may be appreciated that the object selector 532 may be used at a beginning of a content extraction process to determine and define the instance 510 of the object 506 from the seed document 104. For example, the seed document 104 may contain many different instances of different objects, and a first content extraction may be performed with respect to a first object (instance), and a second content extraction may be performed with respect to a second object (instance).

Meanwhile, the field value detector 534 may be configured to determine that the first value 512a of the seed document 104 and the first value 520a of the selected document 516 both correspond to the same field 508a of the object 506. For example, this determination may be made based on rules logic 536 associated with the content extraction system 502.

The rules logic 536 may be configured to cause the determination to be made by relating characteristics of the first value 512a of the seed document 104 to characteristics of the first value 520a of the selected document 516. For example, the rules logic 536 may be configured to determine that the first value 512a of the seed document 104 and the first value 520a of the selected document 516 both correspond to the same field 508a, based on similar font types, positional similarity of the values 512a, 520a within the documents 104/516, similar text preceding the terms/values 512a, 520a, or other similarities, differences, patterns, or contexts within the document(s) 104/516.

In some implementations, the rules logic 536 may include, or may have access to, existing business system(s) meta-data definitions that may be applied advantageously in the context of FIG. 5. For example, the rules logic 536 may be linked to business logic defining customer characteristics or buying habits, such as social security numbers being of the form xxx-xx-xxxx, invoice numbers being of a certain form that would assist in characterizing previous purchases, or other information regarding customers that may be known in the context of, for example, Customer Relationship Management (CRM) systems.

After selecting a term to correspond to/as the value 512a, the system 502 may be configured to validate the value 512a as such, before populating the database 514 therewith. For example, a validation system 538 may be configured to determine whether to populate the database 514 with the value 512a. For example, the validation system 538 may be configured to present the value 512a to a user, and present the user with an option to accept or reject the second value 512a as such before populating the database 522 therewith. The validation system 538 may be further configured to update rules within the rules logic 536 based on the rejection or acceptance of the value 512a. In this way, the rules logic 536 may be updated and improved over time, and a level of user involvement may be reduced or eliminated in executing the validation system 538.

Figure 6:
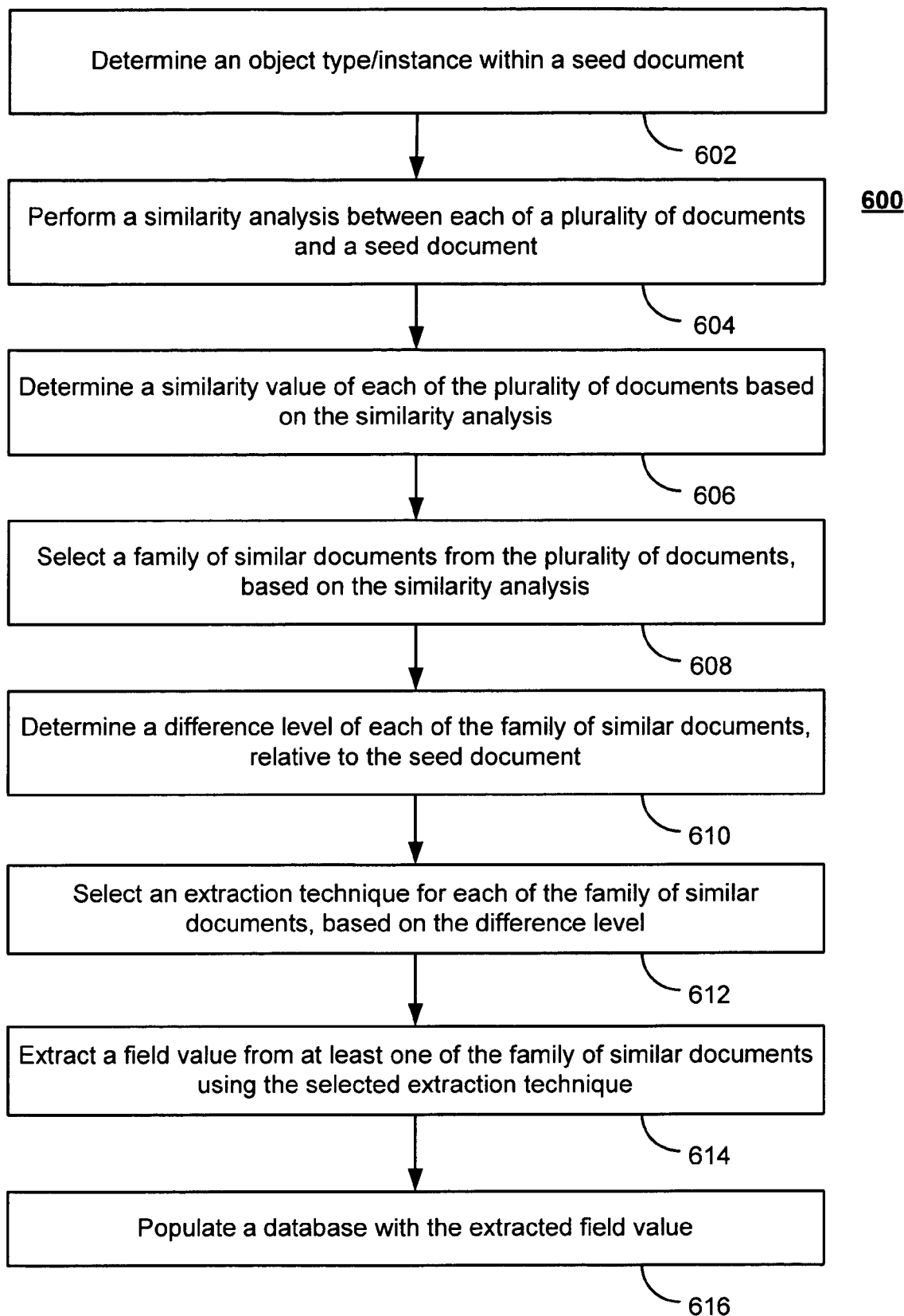
FIG. 6 is a flowchart illustrating a method of populating a database with a field value extracted from a plurality of documents, using the content extraction system of FIG. 5.

FIG. 6 is a flowchart 600 illustrating a method of populating a database 514 with the field value 512a extracted from the selected document 516. In the example embodiment shown in FIG. 6, the object selector 532 may be used to identify the instance 510 within the seed document 104 (602). That is, the seed document 104 may contain many different types of information and terms, and some terms may be a value for multiple types of objects (for example, "address" could be a value for instances of objects "person" or "enterprise"). Thus, the object selector 532 may first select and define the object instance 510 within the seed document 104 relative to the object 506 of the database 514. For example, the object selector 532 may use the template 110 in this analysis, as well as input from a user as to what (type of) object is desired to be extracted.

The document similarity detector 102 may perform a similarity analysis between each of the plurality of documents 108 and the seed document 104 (604). For example, the difference analyzer 118 may be used, and/or the combination of the analyzers 118-122 of FIG. 1, or other similarity analyzers, may be used. The similarity evaluator 124 may then determine a similarity value of each of the plurality of documents 108, relative to the seed document 104, based on the similarity analysis (606), so as to select the family of similar documents 130 from the plurality of documents 108 (608).

The document similarity detector 102, or, more specifically, the difference analyzer 118, may determine a difference level of each of the family of similar documents 130, relative to the seed document 104 (610). For example, the similarity evaluator 124, may compute an aggregated similarity measure, using outputs from the analyzers 118-122. Here, the difference analyzer 118 may, for example, by itself, determine the difference-based similarity, not for a similarity measure as such, but also as a criteria for selecting between one of a plurality of extraction techniques, as described herein, e.g., with respect to FIG. 7.

The extractor 504 may then select the extraction technique for each of the family of similar documents 130, based on the difference level (612). For example, if the resulting difference-based similarity measure is above or below a certain threshold, then a corresponding extraction technique (e.g., using the direct extractor 522 or the indirect extractor 526) may be used, accordingly, as also is described in more detail below, e.g., with respect to FIG. 7.

The extractor 504 may then extract the field value 512a from at least one of the family of similar documents 130, using the selected extraction technique (614). For example, the direct extractor 522 may extract a term "IBM" in one iteration in which IBM is classified as a value of a field "customer," while in a following iteration, perhaps for another user or in another context, the indirect extractor 526 may extract the term IBM as a value of a field "supplier."

The database 514 may then be populated with the extracted field value 512a (1114). For example, continuing the example just given, the field value selector 524 may select the term "IBM" as a possible value, using the rules logic 536, based on a placement of that term within the selected document 516 (e.g., near a paid invoice line item). Then, the validation system 538 may present the term "IBM" to the user as a suggested value for the field "customer." If the user rejects this value for this field, then the validation system 538 may suggest the field "supplier." Conversely, the field "customer" may be presented, and the term "IBM" and following suggested terms, may simply be accepted or rejected as values for that field. In any case, the validation system 538 may then update the rules logic 536, so that, for example, the next time that "IBM" is selected it will be immediately and correctly identified as either a customer or a supplier, based on the earlier rule update and, potentially, without human intervention at that point.

Figure 7:
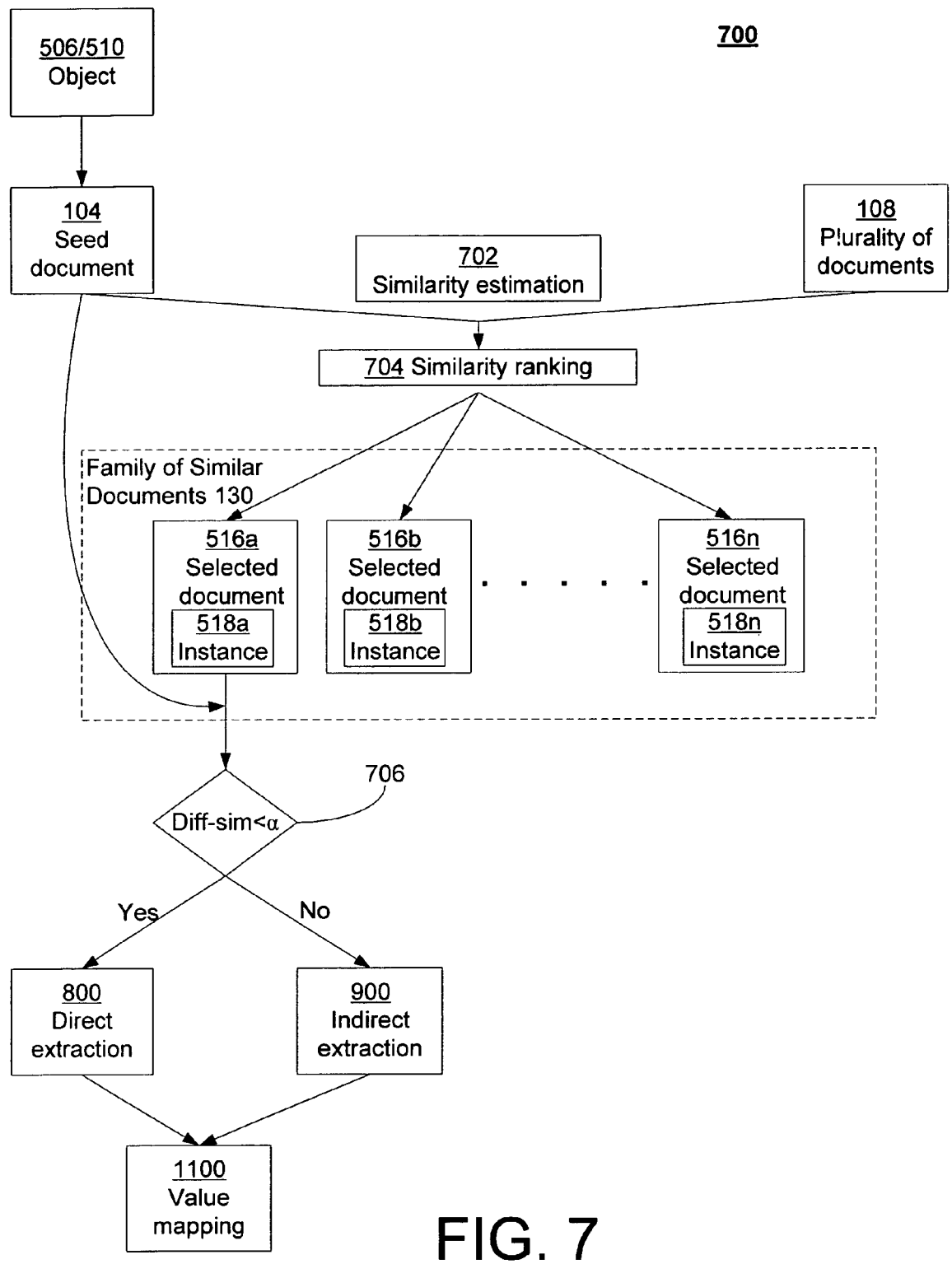
FIG. 7 is a flowchart illustrating a method of extracting field values from a plurality of documents in accordance with the example of FIG. 6.

FIG. 7 is a flowchart 700 illustrating a method of extracting field values from a plurality of documents 108 according to an example embodiment, which may be used in accordance with the operations of FIG. 6. In the example embodiment shown in FIG. 7, the object/instance 506/510 is selected and/or defined, e.g., by the object selector 532, as described above.

The document similarity detector 102 may select the seed document 104 as containing the instance 510 of the object 506. The similarity analyzer 116 may then compare the seed document 104 to each of the plurality of documents 108, perhaps using the document selection logic, to obtain a similarity measure (702), and the similarity evaluator 124 may then estimate a degree of similarity between each document in the plurality of documents 108 and the seed document 104 (704). The similarity evaluator 124 may then assign a similarity ranking to each document 114 in the plurality of documents 108 to obtain the family of similar documents 130 from the plurality of documents 108, as described above. The selected document(s) 516 in the family of similar documents 130 may be considered similar on the basis of each (at least potentially) including an object type or instance, e.g., the instance 516 of the object 506.

The document selection logic 112 then selects, in turn, documents 516a, 516b, . . . 516n from the family of similar documents 130. For each, the difference analyzer 118 may then perform a difference-based similarity analysis on the selected document 516 and the seed document 104, e.g., using Eq. (1), so as to compare a resulting difference-based similarity measure (referred to herein as $sim_{diff}$) to a threshold difference-based similarity level to determine, or at least infer, whether the selected document 516 may have been directly created from the template 110 (706).

In an example embodiment, if the difference-based similarity level exceeds the threshold difference-based similarity level, then the extractor 504 may instruct the direct extractor 522 to perform the direct extraction method 800 discussed with reference to FIG. 8. If, however, the difference-based similarity level of the document in question is less than the threshold difference-based similarity level, then the extractor 504 may instruct the indirect extractor 526 to perform the indirect extraction method 900 discussed with reference to FIG. 9, below. Once the selected extraction technique is performed, a value mapping technique may be executed that takes the results (e.g., terms) of the extraction methods 800 or 900 and maps the terms to corresponding values/fields for inclusion in the database 514, as referenced above and discussed in more detail below with reference to FIG. 11.

FIG. 8 is a flowchart 800 showing the direct extraction method according to an example embodiment. In the example of FIG. 8, the direct extractor 522 may apply the Diff algorithm 524 to the selected document 516, based on the seed document 104 (802). The Diff algorithm 524, for example, may determine which terms were added, replaced, or deleted from the seed document 104 with respect to the selected document 516 (e.g., the selected document 516a). The terms added (e.g., inserted) to the seed document 104 within the selected document 516 are candidates for extraction as the value 512a.

It may then be desirable to rank the selected terms according to importance within the selected document 516. In the example embodiment shown in FIG. 8, the inverse document frequency analyzer 528 may measure an inverse document frequency of each of the selected terms, as described above with respect to Eq. (2). As referenced above, inverse document frequency may be seen as a measure of the relative importance of terms in the family of documents 130 which gives high values to rare (e.g., infrequent) terms, such as proper nouns, and low values to common (e.g., frequent) terms. In the example embodiment shown in FIG. 8, the inverse document frequency analyzer 528 determines the inverse document frequency value for each of the terms which were selected based on the Diff algorithm analysis just described (806).

Once the inverse document frequency analyzer 528 has assigned values to each of the selected terms, the term ranking logic 530 may rank the selected terms based on their inverse document frequency values (808), such as in descending order. The validation system 538, for example, may then present the inserted terms to a user based on their ranking (810), for acceptance or rejection thereof, as referenced above with respect to FIG. 5 and described in more detail below with respect to FIG. 11.

FIG. 9 is a flowchart 900 showing the indirect extraction method according to an example embodiment. In the example embodiment shown in FIG. 9, the indirect extractor 526 may instruct the inverse document frequency analyzer 528 to calculate inverse document frequency values of some or all of the terms in the selected document 516 in the manner described with reference to FIGS. 5 and 8 (902). After the inverse document frequency analyzer 528 has calculated inverse document frequency values for the terms in the selected document 516, the term ranking logic 530 may rank the terms by their inverse document frequency values (904), such as in descending order.

Figure 10:
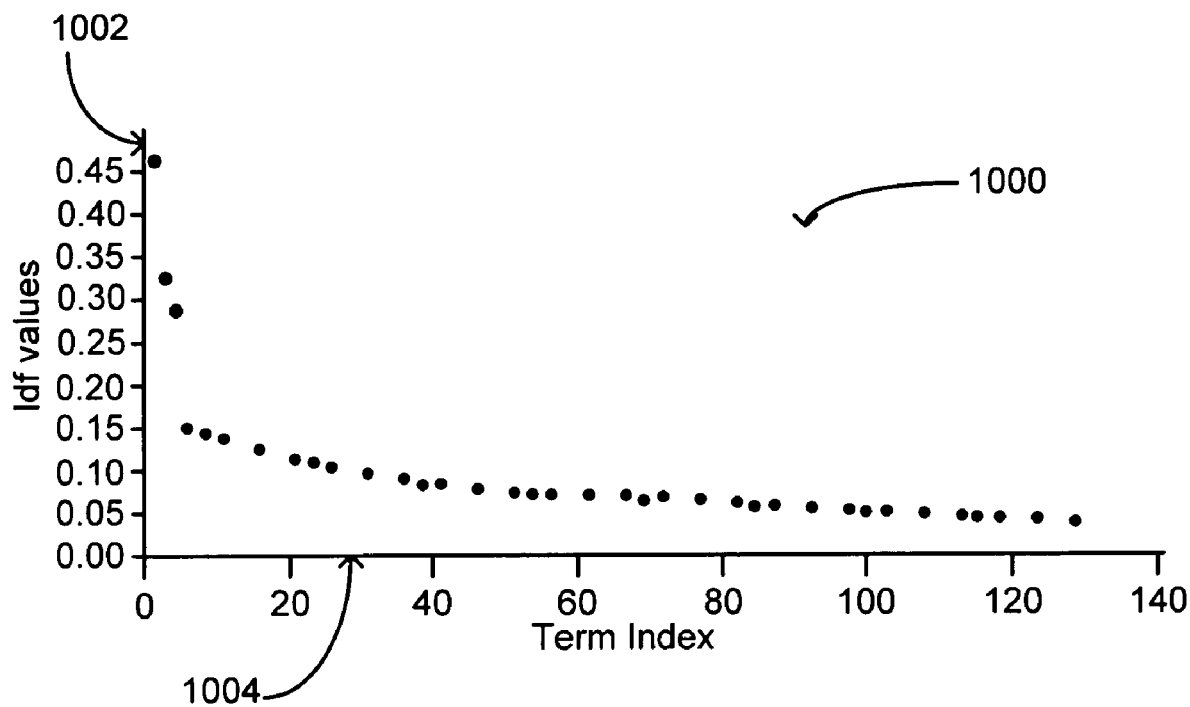
FIG. 10 is a graph illustrating a distribution of inverse document frequency values of terms in a selected document according to an example embodiment.

The indirect extractor 526 may then select the second value 512a of the field 508a from the terms, based on the inverse document frequency values. One example of this selection process includes producing a distribution curve of the terms according to their inverse document frequency values (906). This may produce a graph 1000 showing a distribution of inverse document frequency values of terms in the selected document 516, according to an example embodiment, as shown in FIG. 10, below. As shown in FIG. 10, the distribution of inverse document frequency values 1002 versus the number of documents with that inverse document frequency value 1002, or term index 804, will typically be skewed. This skewing of the distribution may result, for example, from only a few of the terms in the selected document 516 being significant.

Thus, in order to select the most significant terms, the indirect extractor 526 may select the highest ranking terms from the selected document 516, based for example, on a determination that a sum of the inverse document frequency values of these highest ranking terms will approximate a designated proportion, such as one-fifth, of a total sum of inverse document frequency values of all of the terms in the selected document 516 (908). This methodology is conceptually similar to the techniques discussed above for calculating the family of similar documents 130 as discussed with respect to FIGS. 1-4, but is applied here to the IDF values. Consequently, for example, a different (e.g., smaller) fraction of terms may be selected than in the document-based example of FIGS. 1-4, e.g., due to the relatively greater skewing of importance of significant terms, as just discussed.

The indirect extractor 526 may then create a list of the most significant terms (910). The field value detector 534 may then apply the rules logic 536 and/or present the terms to a user for validation, using the validation system 538, as described herein.

Figure 11:
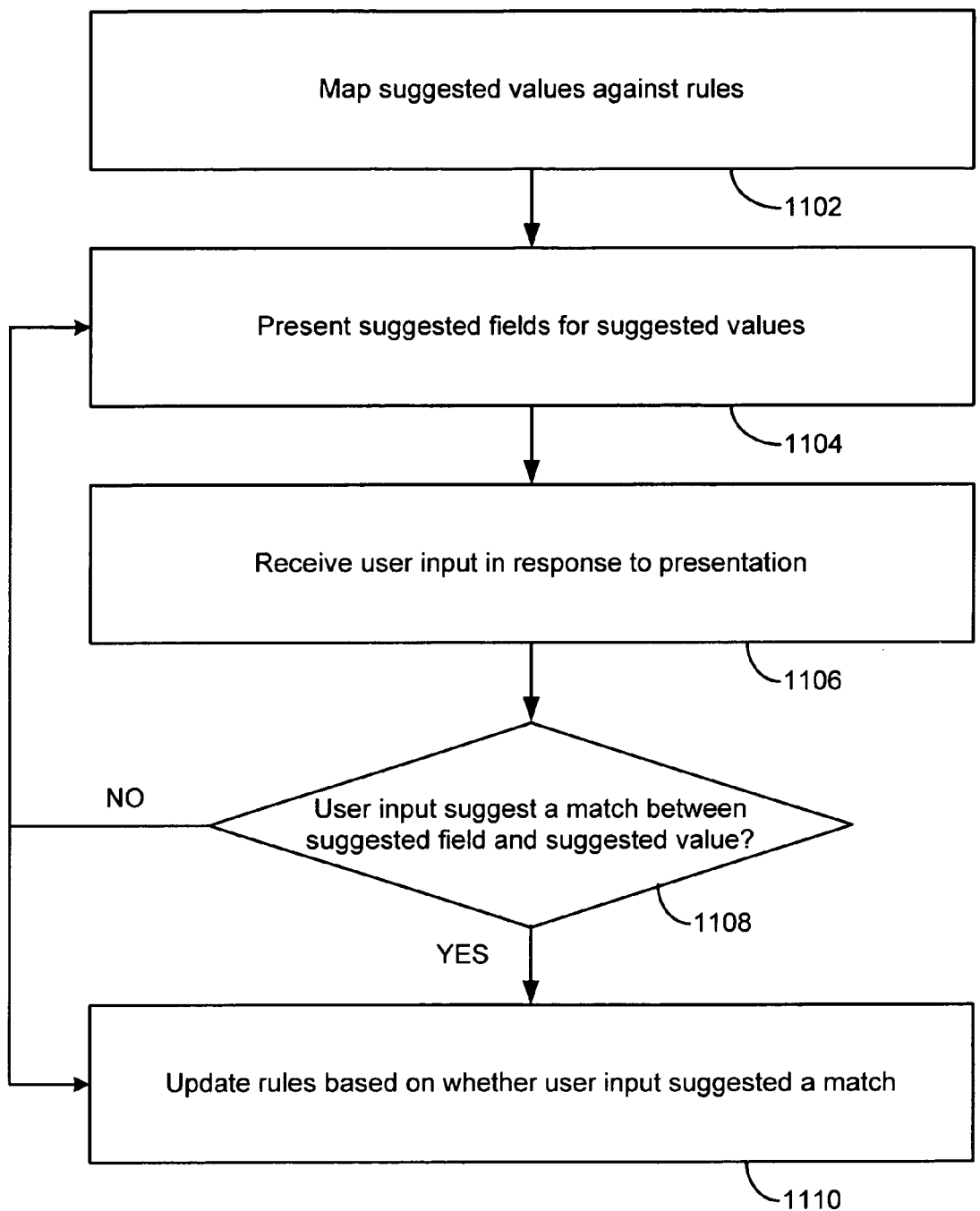
FIG. 11 is a flowchart illustrating a method of adapting rules based on user responses to suggested field values.

FIG. 11 is a flowchart 1100 illustrating a method of mapping selected terms to database values, based on updateable rules logic. For example, once the direct extraction of FIG. 8 or the indirect extraction of FIG. 9 is completed, the result will include terms that are presented as potential values for the object 506.

As already described, the field value detector may thus map the terms to potential field values, using the rules logic 536 (1102). The validation system 538 may then present a suggested field 508a to a user for each of the suggested values 520a (1104). The validation system 538 may then receive user input in response to the presentation of the suggested fields 514 for each of the suggested values (1106). The validation system 538 may then determine whether the user input suggests a match between the suggested field 508a and the suggested value 520a (1008). If not, then the validation system 538 may update the rules logic 536 accordingly (1110) and present a subsequent suggested field for the value 520. If so, then again the validation system 538 may update the rules logic 536 accordingly (1110). After a number if iterations, the rules logic 536 may require less human intervention to determine whether the suggested value 520a matches the suggested field 508a.

Although the above discussion is provided with reference to specific examples, it will be appreciated that many other examples are contemplated. For example, although the document similarity detector of FIG. 1 is illustrated as being used with the content extraction system 102, it will be appreciated that other similarity detector(s) or techniques may be used, as well.

Also, as another example, rather than extracting single terms, an example embodiment may extract phrases or groups of terms from the selected document 516 and present the phrases or groups of terms to the user for validation. According to this embodiment, the value 520a may be a phrase which includes two or more consecutive terms (e.g., a first and last name of a person). The extractor 504 may be configured to determine that the consecutive terms make up a phrase, for example, by determining an inverse document frequency of the possible phrase and determining an inverse document frequency of each of the terms in the phrase. Then, according to one example embodiment, if the inverse document frequency of the possible phrase is greater than or equal to the inverse document frequency of each of the consecutive terms in the possible phrase, then the consecutive terms may be considered a phrase and be extracted as the value 512a.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A system comprising:
a data processing apparatus comprising: a processor, and further comprising: a document similarity detector configured to determine a family of documents based on a similarity analysis between content of a seed document and content of the family of documents, the content of the seed document associated with at least one database object having at least one field, the document similarity detector being further configured to determine a difference level between the content of the seed document and a content of the at least one document of the family of documents; and
a content extraction system configured to determine a ranking of a plurality of terms from within the at least one document, based on a relative frequency with which each of the plurality of terms appears within the family of documents, and configured to extract at least one term from the plurality of terms as being associated with a value of the at least one field, based on the ranking, and configured to select a direct extraction technique based on the difference level, relative to a threshold difference level and configured to extract the at least one term from the content of the at least one document using the direct extraction technique,
the direct extraction technique including:
performing a diff algorithm on the content of the at least one document
relative to the content of the seed document
selecting terms form the content of the at least one document, including
the at least one term, based on the performing;
determining inverse document frequency values of the selected terms;
ranking the terms according to their inverse document frequency values;
and
presenting the at least one term to a user as being associated with the
value, based on the ranking.

2. The system of claim 1 wherein the document similarity detector includes a difference analyzer configured to determine the family of documents using a difference-based similarity analysis between the seed document and each of the family of documents.

3. The system of claim 1 wherein the document similarity detector is configured to perform the similarity analysis including at least two similarity analyses, and wherein the document similarity detector includes a similarity technique aggregator configured to combine results of the at least two similarity analyses to determine the family of documents.

4. The system of claim 1 wherein the content extraction system is configured to determine the relative frequency based on a relation between a number of the family of documents and the number of the family of documents in which each term appears.

5. The system of claim 1 wherein the content extraction system is configured to select the extraction technique from a plurality of extraction techniques, based on the difference level relative to a threshold difference level.

6. The system of claim 1 wherein the content extraction system includes a direct extractor configured to extract the at least one term from the content of the at least one document by determining the at least one term as being included within replaced or inserted terms within the at least one document, relative to the seed document, and then determining the ranking of the plurality of terms as including the replaced or inserted terms.

7. The system of claim 1 wherein:
the content extraction system includes an indirect extractor configured to extract the at least one term from terms in the content of the at least one document, based on the ranking as determined for each of the plurality of terms.

8. The system of claim 1 wherein the content extraction system is configured to determine the ranking by determining an inverse document frequency value for each of the plurality of terms and determining the ranking based on the inverse document frequency values.

9. The system of claim 1 further comprising:
a computer-readable medium comprising a database structured in accordance with the object;
wherein the extractor is configured to populate the database with the value.

10. The system of claim 1 wherein the data processing apparatus further comprises a validation system configured to present the at least one term as associated with the value to a user, and further configured to present the user with an option to reject the at least one term as the value.

11. The system of claim 1 wherein the data processing apparatus further comprises:
a field value detector configured to associate the at least one term with the value, based on rules logic associating terms with values based on characteristics of the terms; and
a validation system configured to present the at least one term as associated with the value to a user, and configured to present the user with an option to accept or reject the at least one term as the value,
wherein the validation system is configured to update the rules logic based on acceptance or rejection of the at least one term as the value by the user.

12. A computer program product being tangibly embodied on a computer-readable storage medium and being configured to cause a data processing apparatus to:
perform a difference-based analysis between content of a seed document and content of at least one document selected from a plurality of documents, the content of the seed document associated with at least one database object having at least one field;
determine a difference level between the seed document and the at least one document;
select an extraction technique for extracting at least one term from the content of the at least one document, based on the difference level; and
extract the at least one term as being associated with a value of the at least one field, using the selected extraction technique;
wherein:
selecting the extraction technique includes selecting a direct extraction technique
based on the difference level relative to a threshold difference level; and
extracting the at least one term using the direct extraction technique includes:
performing a diff algorithm on the content of the at least one document
relative to the content of the seed document;
selecting terms from the content of the at least one document, including
the at least one term, based on the performing;
determining inverse document frequency values of the selected terms;
ranking the terms according to their inverse document frequency values;
and
present the at least one term to a user as being associated with the value, based on the
ranking.

13. The computer program product of claim 12:
wherein the plurality of documents are selected based on a similarity analysis between each of the plurality of documents and the seed document; and
wherein the extraction technique is based on a ranking of a plurality of terms from within the at least one document, as determined from a relative frequency with which each of the plurality of terms appears within the family of documents.

14. The computer program product of claim 12 wherein the computer program product is further configured to determine that the at least one term corresponds to the value of the at least one field based on rules logic relating characteristics associated with the at least one term to characteristics of the at least one field.

15. The computer program product of claim 12 wherein:
selecting the extraction technique includes selecting an indirect extraction technique based on the difference level relative to a threshold difference level; and
extracting the at least one term using the indirect extraction technique includes:
determining inverse document frequency values for terms in the content of the at least one document, including the at least one term;
selecting a subset of the terms, including the at least one term, based on their inverse document frequency values; and
presenting the subset of the terms to a user as being associated with the value.

16. The computer program product of claim 12 wherein the computer program product is further configured to populate a database with the value, the database being structured to include the database object.

17. A method comprising:
performing, by a data processing apparatus, a similarity analysis between each of a plurality of documents and a seed document;
determining a similarity measure of each of the plurality of documents based on the similarity analysis;
selecting a family of similar documents from the plurality of documents, based on the similarity measure of each of the plurality of documents;
determining a difference level of each of the family of similar documents, relative to the seed document;
selecting an extraction technique for each of the family of similar documents, based on the difference level; and
extracting at least one term from at least one document of the family of similar documents, using the selected extraction technique;

wherein:
selecting the extraction technique includes selecting a direct extraction technique
based on the difference level relative to a threshold difference level; and
extracting the at least one term using the direct extraction technique includes:
performing a diff algorithm on the content of the at least one document
relative to the content of the seed document;
selecting terms from the content of the at least one document, including
the at least one term, based on the performing;
determining inverse document frequency values of the selected terms;
ranking the terms according to their inverse document frequency values;
and
presenting the at least one term to a user as being associated with the value, based on the ranking.

18. The method of claim 17 wherein selecting the extraction technique for each of the family of similar documents, based on the difference level, comprises:
selecting between
the direct extraction technique associated with a relatively high value of the difference level and a determination of a creation of the at least one document from a first template from which the seed document was also created, in which the at least one term is included in the at least one document, relative to the seed document, as a direct term-insertion or term-replacement; and
an indirect extraction technique associated with a relatively low value of the difference level and a determination of a creation of the at least one document and the seed document from a second template used as a guideline therefor.

* * * * *